(No Model.)

F. H. RICHARDS.
GRAIN WEIGHER.

No. 443,180. Patented Dec. 23, 1890.

Witnesses:
W. M. Bjorkman.
Henry L. Reckard.

Inventor:
Francis H. Richards

UNITED STATES PATENT OFFICE.

FRANCIS H. RICHARDS, OF HARTFORD, CONNECTICUT, ASSIGNOR TO THE PRATT & WHITNEY COMPANY, OF SAME PLACE.

GRAIN-WEIGHER.

SPECIFICATION forming part of Letters Patent No. 443,180, dated December 23, 1890.

Original application filed February 26, 1890. Serial No. 341,196. Divided and this application filed July 14, 1890. Serial No. 358,635. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Grain-Weighers, of which the following is a specification.

This invention relates to grain-weighers; and it consists in regulator apparatus therefor, the object being to furnish means suitable for actuating the regulator-valves of large-sized grain-weighing machines.

This application is a division of my application, Serial No. 341,196, filed February 26, 1890, to which reference may be had for a more particular description of those parts shown, but not fully described herein.

Figure 1:
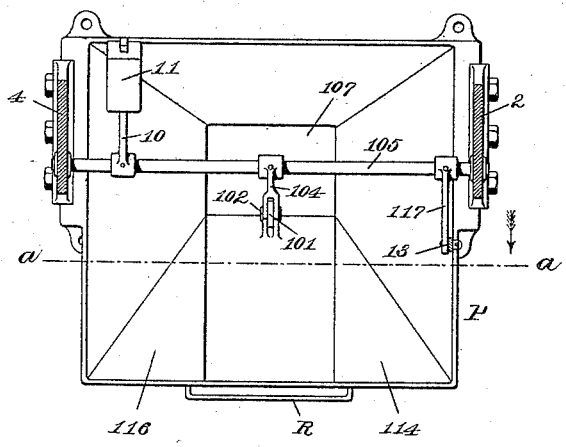
Figure 2:
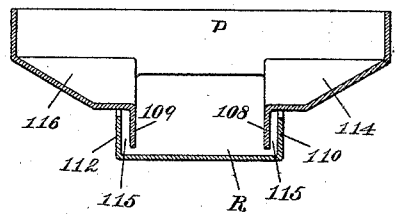
Figure 3:
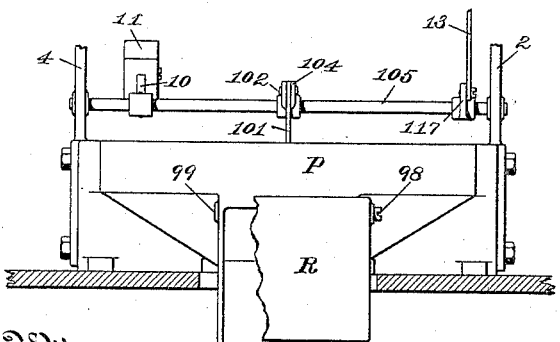
Figure 4:
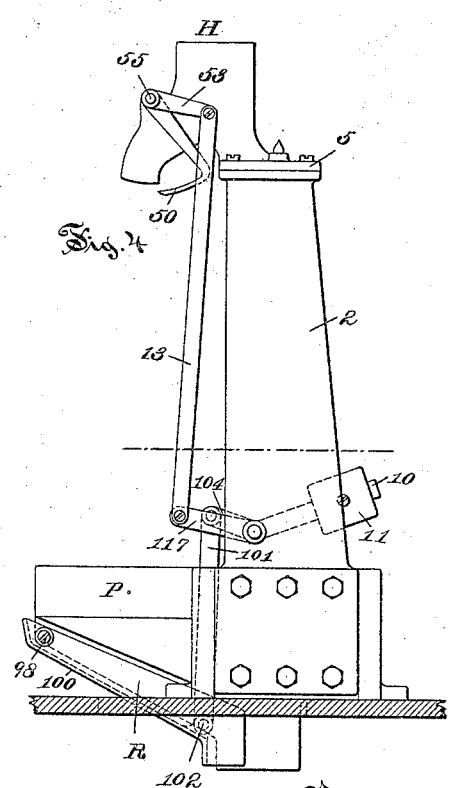

In the drawings accompanying and forming a part of this specification, Figure 1 is a plan view of a regulator-hopper and apparatus embodying my present improvements. Fig. 2 is a vertical section in line $a\ a$, Fig. 1. Fig. 3 is a front elevation of the parts shown in Fig. 1, a portion of the movable regulator being broken away. Fig. 4 is a side elevation of the apparatus, showing the grain-weigher frame-work with regulator-valve carried thereon.

Similar characters designate like parts in all the figures.

The frame-work for carrying the operative parts of the machine usually, and as shown in the drawings, comprises two side frames or uprights 2 and 4, held together by a top plate 5, carrying a supply-chute H, and by the hopper P, which in this case constitutes the base of the machine. Said hopper stands under the grain-bucket, as shown in my said prior application, and receives the grain discharged by said bucket, which passes down through the continuously-open discharge-outlet 107 to a grain-receiving conduit or machine. (Not shown.) The several sides constituting the floor of the hopper P are inclined downwardly toward said outlet 107, in a well-known manner, so that any grain delivered into any part of the hopper P will slide down said floor parts toward said outlet. The front part of the hopper-floor is divided by an opening into two parts 114 and 116, on whose adjacent edges are the depending side walls 108 and 109, which opening adjoins and communicates with the discharge-outlet 107. Below said floor-opening there is suitably supported a vertically-movable regulator R, which is pivoted near its upper end at 98 and 99 to said hopper, and at its lower end is connected by a rod 101 (pivoted thereto at 102) with the arm 104, which is fixed to a rock-shaft 105, that is journaled in the aforesaid uprights 2 and 4. From the sides of the principal part or plate 100 of said regulator R rise side walls 110 and 112, respectively, which stand at some distance outside of the walls 108 and 109, leaving a free space, as 115, for grain between the walls of each pair of walls, respectively. Said side spaces 115 should be wider horizontally than the largest dimensions of the kernels of grain, so as to avoid clogging of the regulator by the grain wedging between the vertical walls.

The shaft 105 is actuated for the raising of the regulator R by means of a counter-weight 11, which is carried on the weight arm or lever 10, that is fixed to said shaft. For connecting said shaft with the regulator-valve, the shaft is provided with an arm 117, which is connected by a rod 13 to the arm 53 of the regulator-valve 50, that is carried on pivots 55, supported on the supply-chute H. The organization of these several parts is such, substantially as shown in Fig. 1, that the valve 50 will be moved under the chute H on the descent of the regulator R, and vice versa.

The regulator R has at its lower edge a depending wall forming the front wall of the discharge-outlet 107 of the hopper P, and the side walls 110 and 112 of said regulator extend for some distance alongside of the side walls 108 and 109 of the discharge-outlet, thus directing the flow of grain from the spaces 115 115 between the regulator and hopper vertical walls.

The operation of my improved regulator apparatus will be evident from the drawings and preceding description. When the regulator-plate 100 is raised nearly to the side walls 108 and 109, as shown in Figs. 2 and 4, the regulator-valve stands open, as shown in Fig. 4. Grain being now delivered into the hopper P in sufficient quantity, the pressure thereof on the plate 100 carries down the same, and through the connections described raises the counter-weight 11 and closes the valve 50 under the chute H. During this action of the mechanism, the grain works freely under the walls 108 and 109 against the regulator-walls 110 and 112, respectively, and on the rising of the regulator said grain is carried up (more or less) between the walls of each pair of walls in the spaces 115 115; but (said spaces being of sufficient width) as the grain slides down the hopper sides toward the discharge-outlet 107 the grain between said walls also slides down toward said outlet, thus preventing any clogging of the regulator. When the grain has been sufficiently discharged through said outlet 107, the counter-weight 11 overbalances the weight of and pressure on the regulator and raises said regulator and closes the regulator-valve, when the parts again stand as shown in Fig. 4.

Having thus described my invention, I claim—

1. In a grain-weigher having a supply-chute and a regulator-valve therefor, the combination, with the fixed hopper located below the grain-bucket and having a continuously-open discharge-outlet, and having a floor-opening, substantially as described, in one of the floor-walls thereof adjoining and connecting with said discharge-outlet, of the vertically-movable regulator-plate underneath and closing said floor-opening from the outer edge thereof to said discharge-opening and normally supported by counterweighting, said plate being connected with the valve, whereby the machine is regulated by the action of the grain on said plate.

2. In a grain-weigher, the combination, with a supply-chute and the regulator-valve and with the hopper having a discharge-opening and the floor-opening at one side thereof, and having the depending walls at the edges of said opening, of the counterweighted regulator-plate 100, having side walls 110 112 outside of said depending walls, said plate being connected with the regulator-valve, and there being a free space between the adjacent depending and side walls.

FRANCIS H. RICHARDS.

Witnesses:
HENRY L. RECKARD,
LEWIS C. HEERMANN.